April 18, 1961   F. J. MEYER   2,980,202
IRRADIATING APPARATUS
Filed Jan. 12, 1954   2 Sheets-Sheet 1

INVENTOR.
FRED J. MEYER
BY
ATTORNEY

April 18, 1961 F. J. MEYER 2,980,202
IRRADIATING APPARATUS
Filed Jan. 12, 1954 2 Sheets-Sheet 2
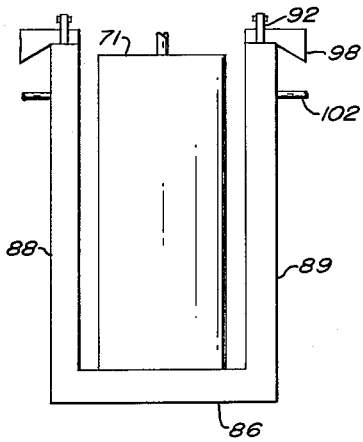
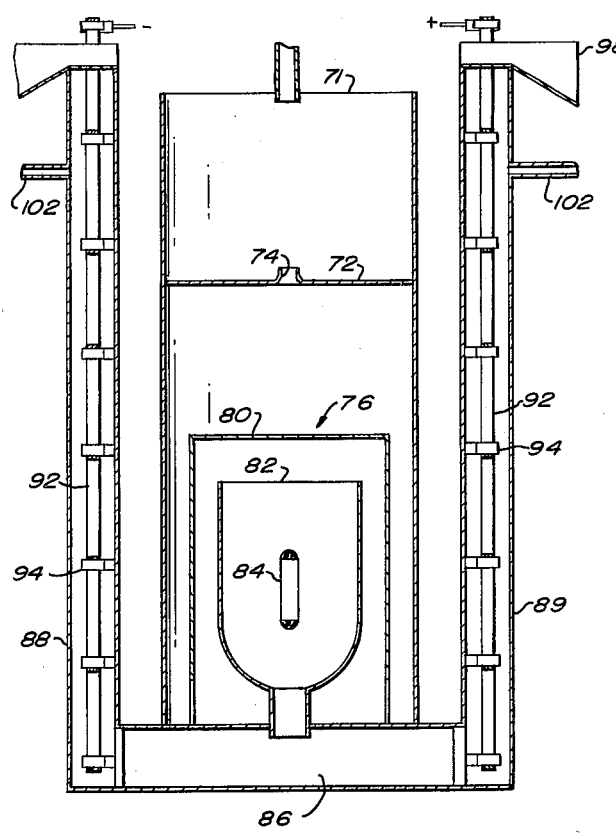
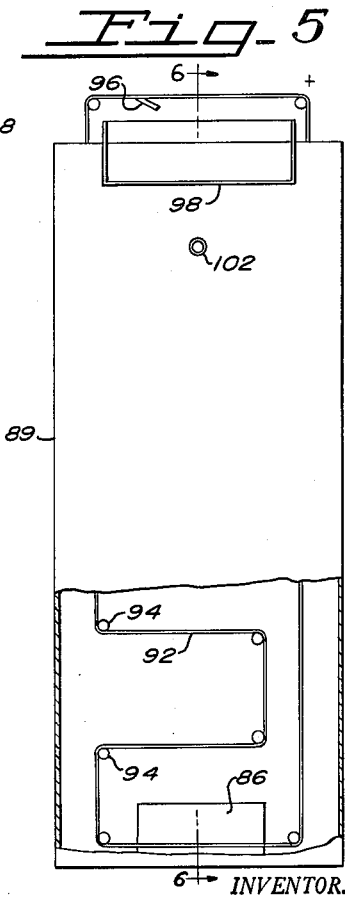
INVENTOR.
FRED J. MEYER
BY
ATTORNEY

United States Patent Office 2,980,202
Patented Apr. 18, 1961

2,980,202
IRRADIATING APPARATUS
Fred J. Meyer, 355 Highland Drive, Adrian, Mich.
Filed Jan. 12, 1954, Ser. No. 403,579
11 Claims. (Cl. 183—7)

This invention relates to radiology and more particularly to the irradiation of materials to change the materials, or cause separation, reaction or other electrical or chemical effect.

One form of the invention is an apparatus for separating solid particles from gas, for instance, the removal of dust from air to clean in air conditioning or cleaning equipment. Other processes related to this form of the invention are the recovery of valuable dusts from air or gas dispersions thereof.

Another form of the invention is an apparatus for effecting chemical reactions, including the combining, separation, or precipitation, of materials.

It is an object of the invention to effect changes in materials not heretofore possible or practicable on a commercial scale.

Another object is to provide for irradiation of materials to effect electrochemical changes in the materials.

Another object of the invention is to irradiate in one zone fluids containing dispersions or solutions of materials to be reacted, precipitated or otherwise separated, and flowing the fluid to another zone where the precipitation, separation or combining of the products of the reaction or other irradiated constituents of the fluid is carried out or completed.

It is another object of the invention to irradiate suspensions of particles in air or other gases and to deposit the irradiated particles on charged collecting means.

It is a still further object of the invention to irradiate particles suspended in a fluid, such as a gas, and then move the irradiated suspension to another zone and to subject the irradiated suspension to the effects of operative means such as electrostatic or other electric means, or mechanical means, for instance, filtering devices.

It is another object of the invention to carry out the irradiation of the material by means of sources of irradiation effective to bring about changes in the materials of a magnitude and in times previously not considered possible.

Other objects of the invention will be apparent from the following description and from the drawings, in which:

Figure 4 is an elevational view of a modified form of the invention for treating liquid suspensions or solutions;

Figure 5 is an end view of the same; and

Figure 6 is a vertical central section of the same taken on the line 6—6 of Figure 5.

Figure 1:
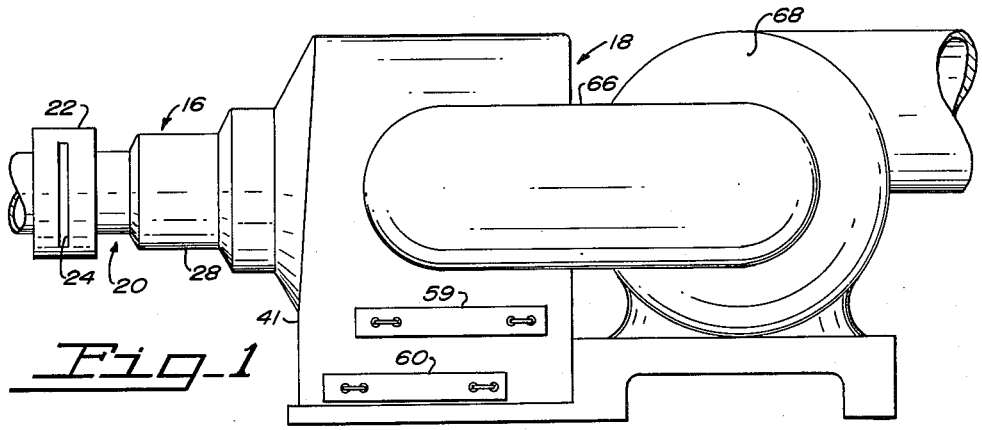
Figure 1 is an elevational view of an apparatus of the invention adapted for acting on gaseous systems, such as suspensions of materials in gases, and illustrates a device particularly designed for removing dust from air.
Figure 2:
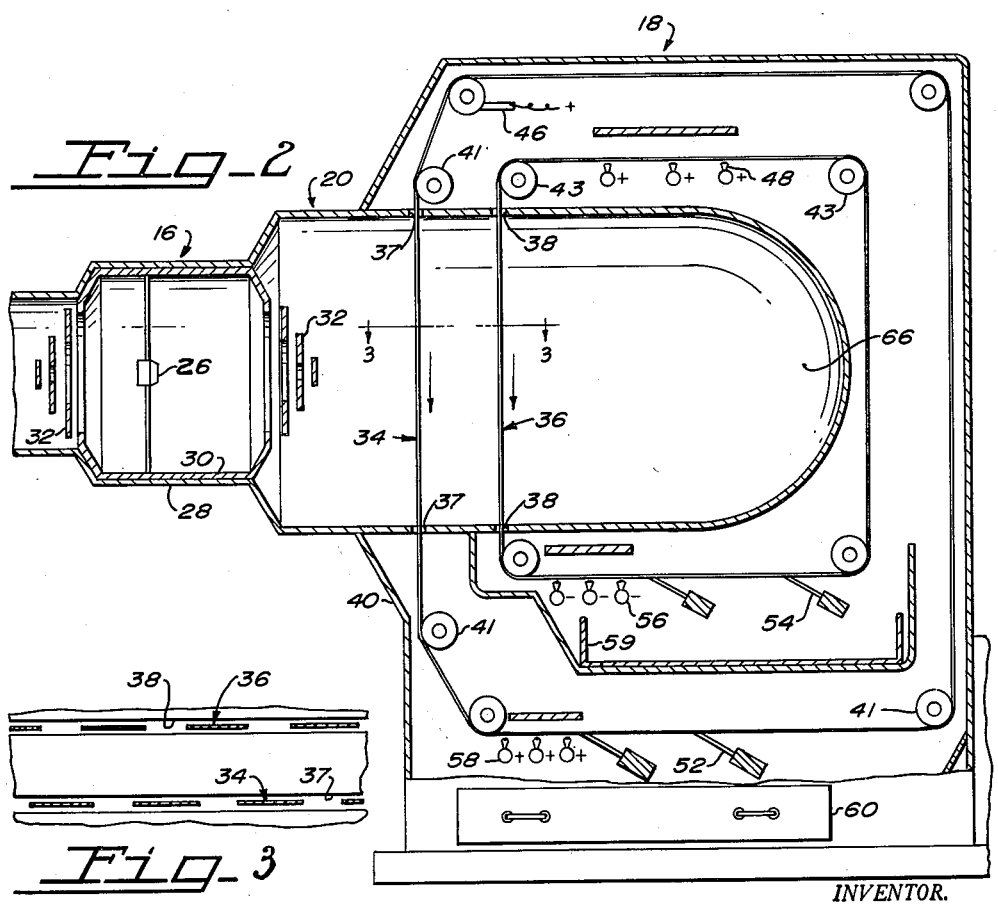
Figure 2 is a longitudinal sectional view of the apparatus shown in Figure 1.
Figure 3:
Figure 3 is a cross-sectional view taken in the plane of the line 3—3 of Figure 2.

The apparatus shown in Figures 1, 2 and 3 is adapted to take dust from air or other gas by creating a flow of the air or gas through an irradiating chamber 16 and then through a collecting zone 18. The irradiating zone and the collecting zone form sections of an air passage 20 containing a primary dust removal or filtering section 22 which may include a suitable mechanical air filter, for instance, an impingement-type filter 24 through which the air to be treated passes for removal of larger dust particles. The air thus filtered passes next through the irradiating chamber 16.

The irradiating chamber is preferably defined by a cylindrical wall 28 having a lining 30 of lead or other shielding metal. The end walls of the chamber 16 are each formed by a series of concentric louvres 32 overlapping and spaced apart to permit the passage of air therethrough but at the same time to prevent the escape of irradiating rays from the chamber. The louvres making up the end walls are also preferably of a shielding material such as lead. Although the chamber 16 is shown as of cylindrical shape, it may be of other shape, for example, may be constricted at its median portion so as to cause the air passing through the chamber to pass through a zone of reduced cross-sectional area.

Located within the chamber 16 is a source of rays effective to irradiate streams of gas or air passing through the chamber. The source is one giving off rays having a wave length of from 1000 Angstrom units to .0001 Angstrom unit or less. X-rays and rays like X-rays are suitable and for this purpose there may be centrally located within the chamber 16 X-ray tubes 26 arranged to direct beams of X-rays across the diameter of the chamber 16 in such a way as to cause all air or gas flowing through the chamber to be acted upon by the rays. One or more X-ray tubes or other sources of rays may be located within the chamber 16, either located adjacent each other or spaced axially of the chamber, or if desired, arranged in spaced-apart relation about the interior circumference of the chamber. In any case, the arrangement of the sources of the rays is designed to produce an irradiation that is effective to ionize or accomplish the other desired change in the gas or gas-borne material passing through the chamber 16.

In place of X-ray tubes other sources of rays of the wave length specified may be employed. Radio-active materials are particularly desirable because they provide a more constant source of rays, they are as a rule less expensive and are more relible. Radio-active materials such as cobalt-60, chromium 51, tungsten 187, silver 110 or silver 11, zince 65 or other radio-active materials such as shown, for instance. in "Isotopes—Catalog and Price List" of July 1952 published by Oak Ridge National Laboratory, may be employed as such sources, and pieces of such materials, referred to as irradiated units, may be supported as at 26 within the chamber 16 to produce the irradiating effect desired.

After the air leaves the chamber 16 it flows into the collecting chamber 18 where it passes between or over collecting means providing collecting surfaces upon which particles of solid or liquid material suspended in the air or gas may be deposited. These collecting surfaces may be charged electrically to serve to attract the particles to the collecting surfaces.

In the illustrative form of the invention shown in Figures 1 to 3, the collecting means is an upstream series 34 of endless belts and a downstream series 36 of similar endless belts. The belts of each series are trained over rollers so that the belts of each series travel in side by side relation but spaced apart a distance designed to permit ready flow of air through the series of belts. This distance may be somewhat less than the width of the individual belts and the belts of one series may be staggered with respect to the belts of the other series, as shown in Figure 3, so as to cooperate to baffle the flow of air through the belts.

As previously described, the end walls of the chamber 16 are in the form of louvres that prevent the escape of rays from the interior of the chamber. As a consequence, the irradiating chamber is effectively separated from the collecting chamber so that the irradiating rays will not reach the collecting means and thereby affect the collecting means.

The series 34 and 36 of belts traverse the air passage 20, which in this collecting section is preferably rectangular in cross-section and has slots 37 and 38 in its upper and lower walls, through which the belts of the two series pass. This rectangular collecting section of the air passage is substantially completely enclosed within a casing 40 that is closed to the atmosphere. As a result, upon start-up the interior of the casing is quickly brought to the same pressure as the interior of the collecting chamber due to communication through the slots 37, 38 and thereafter no flow of air through said slots takes place, so that leakage of surrounding air into the collecting chamber is avoided.

The belts of the upstream series 34 are trained about rollers 41 extending preferably the full width of the collecting section of the air passage and arranged to travel the belts in a substantially rectangular path. The belts of the downstream series 36 are similarly trained about rollers 43 arranged to guide the belts through a substantially rectangular path inside of the path of the belts of the upstream series. The rollers 41 and 43 may be rotated by suitable power means to move in the same direction as shown in the drawings or, if desired, to have the rollers 41 move in opposite directions to the rollers 43. Thus the belts of the two series may move either in the same direction or in reverse directions.

The belts are preferably of dielectric material and are charged electrically so as to attract charged or ionized particles suspended in the air stream flowing from the irradiating chamber 16. The charging means for the belts may be any suitable kind and are shown as of two typical kinds in Figure 2. The belts of the upstream series are charged by means of a brush 46 engaging one of the rollers 41 and having connection with a source of electrical potential. The potential may be of positive polarity to charge the belts to like polarity. The belts of the downstream series 36 are shown as charged by means of point-discharge electrodes 48 directed toward the belts and connected to a sufficiently high potential of positive polarity as to charge the belts to negative potential. If desired, a grounded target may be located at the side of the belts away from the electrodes 48 to assist in charging the belts. As a result of the charging arrangement shown, the belts of the upstream series are charged to opposite polarity to the belts of the downstream series so that particles in the air stream moving past the belts charged to either polarity will be attracted to and tend to deposit on the belts of one or the other series.

The belts carry the deposited material to a removal zone where scrapers 52 and 54 cooperate with the belts of the series 34 and 36 respectively to remove the deposited material therefrom. If desired, the belts may move past discharging means, such as the point-discharge electrodes 56, 58 so as to be discharged just in advance of the scrapers. Trays 59 and 60 in the form of drawers are supported beneath the scrapers 52 and 54 to receive material removed by the scrapers.

The air after passing the belts of the series 34 and 36 moves through a passage 66 into other conditioning equipment or directly into a blower 68 provided for moving the air through the equipment.

Use of the invention permits the separation and collection of extremely fine dust particles, such as those in the nature of the solid matter in smoke. Previously no economical process was available for collecting dusts such as these, although there is a considerable need for this degree of air cleaning particularly in the precision instrument industry and in other places where very accurate and complex finely adjusted machinery and equipment is operating. For instance, even the slightest amount of dust in an ordinary dial telephone exchange causes difficulties and great pains are taken to exclude even the finest dust from the rooms containing the switching equipment. The present invention is highly suitable for cleaning air in such locations. The invention may also be employed for recovering valuable dusts from air in locations where such dusts are generated. The present invention may also be used to treat the mixture of fuel and air being introduced into an internal combustion engine, in which case the air and fuel mixture may pass directly from the irradiating chamber into the engine.

Many of the same principles of the invention may be applied to the treatment of materials in the chemical combination or chemical reaction of the materials. In utilizing the principles of the invention in such a manner, it is desired to pass a fluid such as a liquid or gas containing the substances or materials to be reacted or combined past an irradiating zone, reacting the materials, then precipitating or otherwise separating out the desired products of the reaction and collecting them in a suitable way, for instance, by means of moving belts or removable plates or electrodes. Alternatively, the reaction products may be centrifuged, settled, filtered or in other ways removed.

Such utilization of the principles of the present invention are depicted in Figures 4 to 6 showing a tank 71 which may be made of glass, steel or lead or combinations thereof, for instance, lead coated steel, and into which is supplied a fluid such as a liquid containing substances or materials that will enter into the desired reaction. Crosswise of the tank 71 and intermediate its ends is a partition 72 having a central opening 74 therethrough, and beneath the partition is an open-bottom can 76. The can is smaller in diameter than the inside of the tank 71 so as to provide a cylindrical passage between the can and the wall of the tank. The closed top 80 of the can cooperates with the opening 74 in the partition 72 to cause a flow of liquid first radially of the tank and then vertically thereof to flow over the top and sides of the can 76.

Within the can 76 is an irradiating receptacle 82 of a diameter somewhat smaller than the inside diameter of the can 76 so as to provide a pasage between the receptacle and can. The receptacle contains centrally thereof an X-ray tube or tubes 84 or other source of rays such as those described in connection with Figures 1 to 3 of the drawings. The upper end of the receptacle 82 is open and the lower end of the receptacle communicates with a plenum chamber 86 which in turn is connected at opposite ends to vertically arranged collecting chambers 88, 89 which are preferably disposed at either side of the tank 71. Of course, the plenum chamber may be connected to or form part of any other kind of treating chamber, for example, a settling chamber.

Within each of the vetrical collecting chambers 88, 89 is a collecting belt 92 which passes about a series of rollers 94 so as to double back and forth through the chamber 88 or 89. The endless belt 92 passes out of the chamber 88 or 89 at the top thereof and is engaged by scrapers 96 which remove material deposited on the belt and permit it to fall into a chute 98 from whence it moves to a hopper or other receptacle.

In this form of the invention the collecting belts are charged electrically by brush contactors engaging the rollers 94 at the outside of the collecting chambers. One of the collecting belts 92 is charged preferably to a negative potential and the other belt is charged preferably to a positive potential so as to attract and collect differently charged particles in the fluid passing through the collecting chambers.

In this form of the invention materials to be reacted are provided in a liquid carrier which is supplied to the tank 71 and leaves the tank through exit openings 102 at the upper ends of the collecting chambers 88 and 89. The liquid containing the materials to be reacted may be at various temperatures best suited to cause the desired reaction to take place or heat may be supplied to the liquid while it is passing through the equipment of the invention, for instance, by means of steam or refrigerating coils placed within the tank 71. Also, the liquid passing through the equipment may be under various pressures in which case the system would be completely sealed and the collecting belts 92 would be replaced by means of collecting plates that are received entirely within the collecting chambers 88 and 89 and are replaced periodically to remove the material deposited thereon.

After the material has passed through the tank 71 and past the X-ray tubes or other source of rays and has been irradiated, and the desired reaction has taken place, the ionized molecules and/or the products of the reaction are then collected upon the endless belts 92 in the chambers 88 and 89.

While the apparatus has been described primarily in connection with performing chemical reactions, it is also adaptable to collecting or separating operations where the irradiation of solid particles or emulsified or suspended or dispersed particles or droplets in a liquid are to be separated out. In such cases the irradiation of the suspension or emulsion causes charging of the particles of the suspensoid or the droplets of the emulsoid and these charged droplets or particles are then collected on the charged belts or plates.

In both the form of the invention shown in Figures 1 to 3 and the form of the invention shown in Figures 4 to 6, the apparatus may be duplicated in whole or in part to provide a series of stages through which the fluid passes in sequence. Thus there may be a series of irradiating chambers or receptacles connected in series, the last one being connected to a settling or collecting chamber. Alternatively, an irradiating chamber or receptacle and associated collecting or settling chamber, e.g., a plenum chamber similar to the chamber 86, may be connected in series with one or more similar irradiating chambers or receptacles and associated collecting or settling chambers to form a multi-stage treatment system. In such a system, the fluid to be treated may be passed through the irradiating zones, one after the other, and between irradiations, certain reaction products or other materials to be removed may be settled or collected out of the fluid.

I claim:
1. Apparatus for irradiating and collecting subdivided material comprising a conduit for a fluid suspension of the material, means for flowing the suspension through the conduit, a collecting chamber surrounding and enclosing at least a part of said conduit with separating walls between the conduit and collecting chamber, a plurality of endless belts mounted to traverse paths in said collecting chamber and which for a part of their extent pass through the said separating walls and across said conduit, and a source of irradiation rays located in said conduit upstream of the path of said belts through said conduit.

2. The apparatus of claim 1 wherein the belts are in two series and are charged electrically with one series charged to a different potential than the other series.

3. The apparatus of claim 1 wherein the belts are in two series with one series being located downstream of the other in said conduit.

4. The apparatus of claim 1 wherein means located in the collecting chamber cooperate with the belts to remove therefrom material deposited on said belts as they pass through said conduit.

5. The apparatus of claim 1 wherein the collecting chamber is sealed against the atmosphere.

6. Apparatus for treating a fluid comprising a receptacle for fluid, a chamber received within the receptacle and forming a second receptacle, a source of irradiation rays located in said second receptacle, said second receptacle being smaller than and received within said first receptacle and having its walls spaced from the walls of the first receptacle so as to be surrounded by fluid in said first receptacle, and a conduit connecting said receptacles so as to permit flow of fluid through said receptacles in sequence, said first and second receptacles being arranged to shieldingly enclose said ray source whereby only fluid flowing through said second receptacle is exposed to said irradiating rays.

7. The apparatus of claim 6 wherein the source of rays is a radio-active material.

8. The apparatus of claim 6 wherein the source of rays is an X-ray tube.

9. The apparatus of claim 6 wherein the source of rays is cobalt–60.

10. The apparatus of claim 6 wherein the second receptacle is in communication with a third receptacle and into which the fluid flows from said second chamber after being irradiated.

11. The apparatus of claim 6 wherein the second receptacle is in communication with a third receptacle and into which the fluid flows from said second chamber after being irradiated, and collecting means in said third receptacle.

References Cited in the file of this patent

UNITED STATES PATENTS

| | | |
|---|---|---|
| 1,154,127 | Rasehorn et al. | Sept. 15, 1915 |
| 2,100,155 | Beran | Nov. 23, 1937 |
| 2,381,455 | Jacob | Aug. 7, 1945 |
| 2,449,681 | Wilson | Sept. 21, 1948 |
| 2,576,616 | Livingston et al. | Nov. 27, 1951 |
| 2,579,440 | Palmer | Dec. 18, 1951 |
| 2,593,869 | Fruth | Apr. 22, 1952 |
| 2,595,226 | Cookson | May 6, 1952 |
| 2,610,699 | Penney et al. | Sept. 16, 1952 |
| 2,611,268 | Mellen | Sept. 23, 1952 |
| 2,640,158 | Hicks | May 26, 1953 |
| 2,669,661 | Riddiford et al. | Feb. 16, 1954 |
| 2,756,840 | Maas | July 31, 1956 |

FOREIGN PATENTS

| | | |
|---|---|---|
| 4,695 | Great Britain | Feb. 22, 1897 |
| 700,046 | Great Britain | Nov. 25, 1953 |
| 60,960 | Sweden | July 12, 1924 |